Oct. 21, 1958  A. GREFFE  2,857,156
MIXING APPARATUS

Filed Oct. 1, 1956  3 Sheets-Sheet 1

INVENTOR.
Andre Greffe
BY Webb, Mackey & Burden
HIS ATTORNEYS

United States Patent Office 2,857,156
Patented Oct. 21, 1958

2,857,156

MIXING APPARATUS

André Greffe, Annecy, France, assignor to Societe d'Electro-Chimie, d'Electro-Metallurgie et des Acieries Electriques d'Ugine, Paris, France, a corporation of France Application October 1, 1956, Serial No. 613,183

Claims priority, application France January 11, 1956

13 Claims. (Cl. 266—34)

The present invention relates to apparatus for handling two or more ladles of material so as to pour the contents from one to the other and back and forth between the two to provide for an intimate mixture. The apparatus according to the invention is primarily adapted for use in carrying out metallurgical processes, particularly where the materials are necessarily in molten state for the mixing phase of the process and where a considerable mass of hot material is involved.

In many metallurgical reaction processes involving the intimate mixture of two molten masses, for example, two metals or a metal and a slag or an ore, it is a particular object to have the reaction of these masses reach its equilibrium point in a very short time. This critical objective applies to purely mixture operations as well and is common in those cases, among others, of preparing certain alloys by mixing the molten constituents, of purifying certain metals by mixing with a suitable slag, or of reduction by a mixing process of certain ores and metal in order to obtain one of the metals contained as oxides or salts in those ores.

The present invention is particularly adapted for such operations as the foregoing requiring that the contents be transferred several times between the same pouring ladles to assure an intimate contact of the masses by proper dispersal of the masses within one another. An operation comprising a transferring of this kind is required in the Perrin nickel extracting process as taught in Perrin U. S. Patent No. 2,750,285, bearing application Serial No. 300,355, filed July 22, 1952, and assigned to the assignee of the present application. One of the examples of the Perrin process therein disclosed involves a first ladle partially full of low-grade nickel oxide ore in molten state. Into that ladle the contents of a partially full second ladle of molten ferro nickel are poured from a height and at a rate to violently intermix the two, each of which may have the ratio by weight of ½ to 2 times the other. If such a single pouring is not sufficient to finish the reaction, and in order to continue and pursue the rapid mixing once it starts, the empty second ladle can immediately be set upright and on a firm supporting platform and the entire contents of the first ladle be repoured into the second, etc., recurrently in a cycle from one to the other several times until finally, the mixture or the desired reaction and mixture are complete with the entire mass remaining in one of the ladles. At this point, particularly when a quantity of ferro silicon has been added at the outset of the pouring cycle, the nickel oxide of the molten ore has been reduced by the ferro nickel bath and a part of the iron oxide by the ferro silicon, into a light slag exhausted of nickel oxide. The quantity of relatively heavy ferro-nickel in the bath will have been increased by the weight of the nickel and the iron metal from the respective nickel oxide and iron oxide in the ore being reduced. Inasmuch as the violent pourings accomplish an intimate dispersal of the metal bath initially and subsequently through the slag, the foregoing chemical reduction occurs very rapidly without too much cooling and the effect of the ferro-silicon reducing agent produces a strong exothermic reaction materially compensating for heat losses occurring during the mixing process. Ferro-silicon is particularly suitable for this use as a reducing agent not only because it has a strong and exothermic reducing action, but also because it provides all or at least a part of the iron eventually necessary to keep the percentage nickel content in the ferro-nickel bath not too high, and the iron percentage high enough so that the reduction of the nickel oxide by the iron can be continued to the point of sufficient exhausting of the ore.

Heretofore, one apparatus for mixing molten masses of the foregoing general type has included a crane and rolling-bridge arrangement in which the bridge driver by eye attempts to manipulate and pour the contents of a filled ladle directly into a stationary ladle therebelow. The operation is a delicate one to line up and if either clumsily or slowly performed by the driver, there are many difficulties which arise. For example as the result of inexact registry between the ladles as they are manipulated, if the stream from the pouring ladle falls even partially onto the walls of the receiving ladle so as not to impinge directly onto the contents or if in some cases it falls always at the same point on the contents, the contact between the two masses concerned is imperfect and the mixing is inefficient. Other difficulties include the losses due to the splashes of the stream of liquid being poured and heat losses due to the liquid cooling down if the pouring and repouring operations are slow. A further drawback of rolling bridge and crane is the delicate fastenings required by the slings and rigging to the ladle being handled in order that this ladle be lifted, swung, and tilted for pouring and then substituted for by another ladle with similarly delicate fastenings.

The present invention provides apparatus which materially reduces or largely eliminates the foregoing difficulties and this apparatus involves no complicated slings or rigging with their consequent drawbacks as noted in handling ladles. It comprises essentially a generally upright metal framework having opposite side frames each presenting roller track to receive the rollers of a pair of symmetrically arranged ladle-elevating carriers which are provided within the framework. The ladle-elevating carriers move parallel to the side frames as they ride their roller tracks which are symmetrically arranged with respect to a transverse vertical plane between the side frames and which cross one another at spaced elevated points in this common vertical midplane. By means of interposed lifting chains as herein provided which are trained across and around a power driven overhead winch, and which are connected at their opposite ends to the respective carriers, an operator applies lifting power to selectively raise either carrier out of its normal symmetrical position and causes it to travel in the roller track to an elevated position in which the ladle therein will overhang and tilt toward the other ladle and carrier. Exact registry between the core of the stream of molten material poured between the lade spout and the receiving ladle or an intermediate ladle to which it is directed, is assured due to the unvarying guideway path defined by the fixed track. Reverse rotation of the winch by the operator not only returns the one overhanging ladle to its initial symmetrical position with respect to the other but when continued, this rotation causes the now loaded other ladle to rise and to return its full contents to the empty ladle. It will be apparent that the foregoing operation can be rendered essentially automatic due to its relative freedom from fastenings necessary for the ladle carriers and the lack of complicated slings and rigging for the ladles themselves. Due to their simplified motion of reciprocation these ladle elevating carriages can be built strong enough to insure the handling of filled ladles of 50 tons or more gross weight. Throughout this specification the term ton means a metric ton of 1000 kgs.

Further features, objects and advantages will either be specifically pointed out or become apparent when for a better understanding of the invention, reference is made to the following description taken in conjunction with the accompanying drawings of a preferred embodiment of the invention in which.

Figure 1:
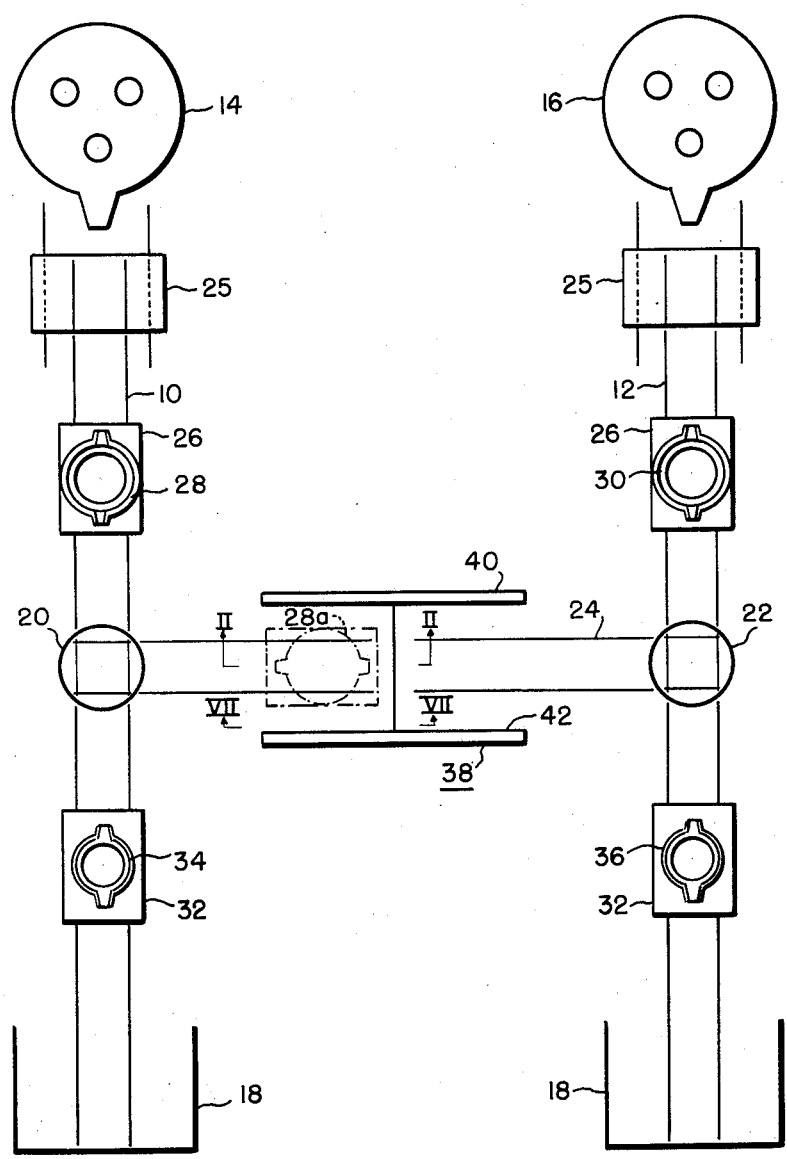
Figure 1 shows a layout in plan of my improved track system for serving various metallurgical equipment including the present mixing apparatus.
Figure 3:
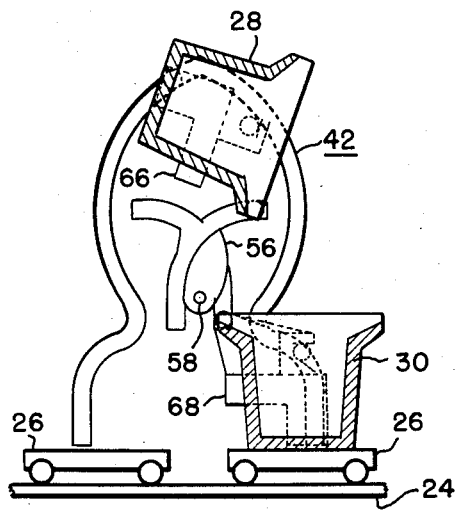
Figures 3 and 4 show the mixing apparatus of Figure 2 in alternating phases of operation in which the illustrated ladles are successively being completely emptied into one another.
Figure 6:
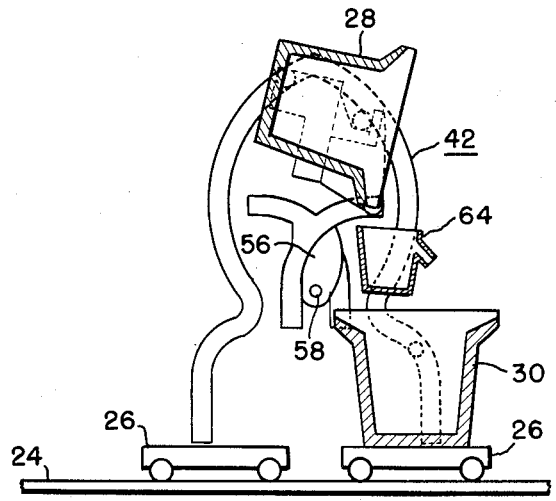
Figure 7:
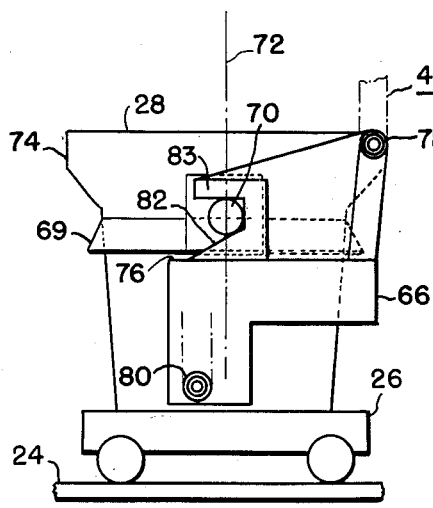
Figure 8:
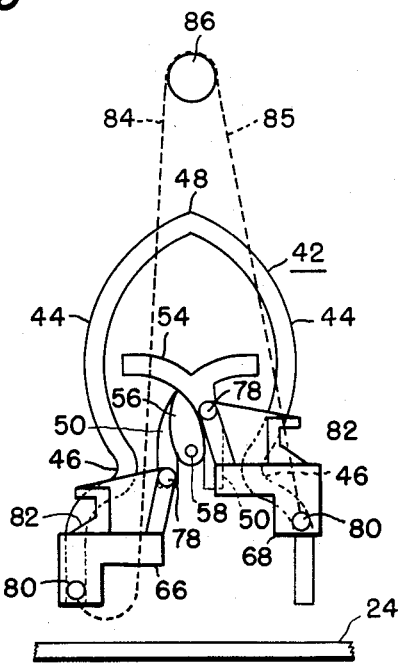

Figure 6 corresponds to Figure 3, but shows a catch ladle intermediate the pouring and receiving ladles;

Figure 7 is a side elevational view of a ladle carrier taken along the section line VII—VII of Figure 1; and Figure 8 is a view similar to Figure 7, but to smaller scale so as to show the entire lifting mechanism for the ladle carriers.

In specific reference to Figure 1, a preferred form of my invention is shown embodied in the layout of a track system of general H-shape for serving certain metallurgical equipment which is diagrammatically illustrated. The H-shaped system includes a generally longitudinally extending pair of dual rail tracks 10, 12 each having a nickel ore melting furnace 14, 16 at one extremity opposite to another end 18. At the midportion the longitudinally extending tracks include the respective turntables 20, 22 having a dual rail cross track 24 interconnecting the same.

A weighing scale 25 provides a short track extension and weighing platform at a corresponding end of each track 10, 12 adjacent the respective furnace 14 or 16 at that end. A first pair of self-propelled wheeled trucks 26 rides the rails of the longitudinal tracks 10 and 12 respectively and one of the trucks has a platform carrying a ladle 28 and the other truck carries a ladle 30 on its platform. A second pair of self-propelled trucks 32 having wheels riding on the respective tracks 10 and 12 carries a pair of waste slag receiving ladles 34 and 36. The turntable 20 enables a truck 26 from the left track 10 to advance the ladle 28 into the dotted line position 28a on the cross track 24 in which it occupies a stall at one end of a mixing apparatus 38. Similarly, the self-propelled truck 26 on the right-hand longitudinal track 12 can move the ladle 30 into the opposite stall within the mixing apparatus 38. When these stalls are unoccupied, the second pair of the trucks 32 can be selectively operated to bring their waste ladles 34 or 36 into the respective stalls within the apparatus 38. This apparatus includes a generally upright framework comprising a pair of metal side frames 40 which straddle the cross track 24 and which together present a system of fixed confronting roller tracks 42 to guide the carriers of the ladles.

The preferred operation of the above track system according to my invention is set forth in the following example, the board purpose being to increase the mass of a ferro-nickel bath while generally keeping the percentage nickel content of the bath within a stated range. If it happens to be an objective that the percentage nickel content is to be kept substantially constant, which may in some cases be desirable, the necessary additional iron metal in the bath is provided by adding ferro-silicon to reduce the iron oxide of the ore and thus supplementing the iron simultaneously therewith as the quantity of nickel builds up in the ferro-nickel bath.

*Example*

The system is operated according to the following steps based on the preliminary assumption that the ladle 28 holds a molten bath of ferro-nickel metal suitable for reducing ore and occupies the dotted line position 28a within the stall at the left end of the mixing apparatus 38 as viewed in Figure 1.

(1) From a position upon the scales 25 to which the self-propelled truck 26 has conveyed the ladle 30, the ladle 30 is filled with molten nickel oxide ore from the furnace 16 until it holds the desired weight of the ore to be reduced. This ore can be of very low grade, having, for example, less than 3% nickel oxide by weight.

(2) The self-propelled truck 26 carries the ore containing ladle 30 across the turntable 22 into its symmetrical position in the stall in the apparatus 38 opposite to the dotted line position 28a of the metal containing ladle 28.

(3) The ladle 28 is lifted by a ladle elevating carrier in the apparatus 38 and violent pouring of the metal bath into the ore contained in the ladle 30 takes place so as to completely empty the contents of the ladle 28 into the ladle 30. The nickel to be reduced by and acquired into this metal bath as a result of its pouring and mixing consists of the greater part of the nickel content of the nickel oxide in the molten ore.

(4) Simultaneously with above step 3, a quantity of ferro-silicon will have been introduced into the stream being poured so as to be carried into the receiving ladle 30 holding the molten nickel oxide ore. The weight of equivalent iron metal added to the bath in the form of ferro-silicon is in substantially the same proportion to the acquired nickel of step 3 as those original proportions of these same metals to one another in the metal bath. That is to say, even though the metal bath keeps increasing in volume each time it reduces a quantity of ore, its bimetal constituents retain their same proportions by weight and hence each time an excess of the bimetal alloy is drawn off, the body of molten alloy retained has the same basic proportions as formerly and the percentage content of nickel and the percentage content of the iron stays uniform through these successive yields that are drawn off. As noted, the nickel content of the bath is preferably never lower than about 25% nickel nor higher than 60% nickel with the balance iron. The container from which the ferro-silicon additive is emptied is removed.

(5) The pouring ladle 28 is returned to its symmetrical position with relation to the receiving ladle 30 and the latter ladle, now full of the molten ore and metal bath mixture, is raised in the apparatus so as to completely empty its contents into the ladle 28.

(6) The filled ladle 28 is thereupon raised above the ladle 30 and the contents are again exchanged and re-exchanged in the necessary number of cycles required to cause the reaction from the mixing to proceed to its conclusion and reach an equilibrium point at a time which the ladle 30 retains the entire mixture. In practice the pourings are always of an odd number generally three, but five or more pourings may be necessary with very low-grade nickel ores which require a more complete mixture to be reduced properly.

(7) The empty ladle 28 is propelled by the truck 26 into solid line position shown in Figure 1 at the entrance to the scales 25.

(8) The self-propelled truck 32 conveys the waste ladle 34 from the left track 10 into the stall of the apparatus 38 formerly occupied by the ladle 28 and the pouring ladle 30 is elevated there-above in a partially emptying pouring position.

(9) A trapping ladle with a suitable metal restraining gate therein is interposed in the stream between the pouring ladle 30 and the waste ladle 34 so as to retransfer the exhausted ore in a continual operation, but to retain any metal bath particles therein which are heavier than the exhausted ore and sink into it to the bottom of the trapping ladle.

(10) The waste ladle 34 holding exhausted ore is transferred by the self-propelled truck 32 to an appropriate point for discharging the de-nickelized ore therein.

(11) The ladle 30 now holding the metal bath only remains in the stall of the mixing apparatus 38 preparatory to repeating the cycle whereby as the next step the ladle 28 would be filled with a molten charge of nickel oxide ore from the furnace 14 and brought into its symmetrical position in the mixing apparatus 38 for mixing the ore with the metal bath.

(12) From time to time depending on the richness of the ore in nickel, a catch ladle for collecting the quantity of ferro-nickel to be drawn off, which has increased at each cycle of operation, is interposed, in the course of step 3 above, in the path of the stream so as to enable the stream to cascade from the ladle 28 into the ladle 30. This excess represents the desired end product of the process and the resulting ferro-nickel alloy after being solidified has many uses.

In each pouring cycle involved in the above steps 1–12, as much as 12 tons of the molten ore can be mixed with an equal amount of the repetitively used ferro-nickel bath and an entire operation of the necessary number of these cycles can be carried out in 20 minutes. For example, 10 tons of iron nickel alloy containing 36.5% nickel and the rest iron were initially contained in the ladle 28. Thereafter, pouring began, supplementing the metal bath with the addition of 110 kgs. of ferro-silicon containing 75% silicon which were violently introduced into a 12-ton charge of low-grade molten ore containing 1.8% NiO by weight and occupying the ladle 30. The bath of iron nickel alloy upon several intermixtures then amounted to 10,350 kgs., containing about 36.8% nickel. The operation was repeated on the remaining metal and a new quantity of 12 tons of the molten ore with an addition of further ferro-silicon. After this second operation the bath totaled about 10,700 kgs. of metal. When the quantity of ferro-nickel present reaches about 12 tons, i. e. after 6 operations, the surplus metal was removed by the catch ladle and the operation was carried on for a further period. After these 6 operations, 72 tons of ore had been de-nickelized in this manner and about 2 tons of a 37% nickel alloy had been drawn off.

Figure 2:
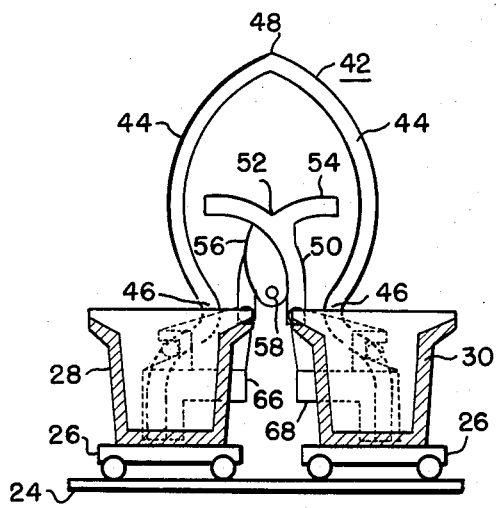
Figure 2 is a section in side elevation taken along the lines II—II of Figure 1 showing the actual mixing apparatus.

In Figure 2 the apparatus is shown in the position corresponding to step 2 foregoing wherein the metal holding ladle 28 is disposed symmetrically opposite to the molten ore holding ladle 30 in their stalls in the mixing appartus. The track system 42 in this apparttus includes a pair of outer trackways 44 each comprising upper and lower arcuate portions joined by a midportion 46 and being upwardly convergent so as to intersect one another at their upper apex portion 48. A pair of inner tracks 50 in the system have arcuate portions which converge upwardly to intersect one another at 52 and which are provided with extensions 54 extending slightly beyond the intersection. A switching device consisting of a gate 56 is pivoted at its lower end to a point 58 adjacent the intersection 52 so as to rock about a horizontal axis.

In Figure 3 the ladles 28 and 30 and the gate 56 are in the position corresponding to step 3 or 6 foregoing in which the ladle 28 is emptying its contents into the ladle 30. The fact that the ladle 28 has just made the movement upwardly and to the right in this figure is evidenced by the rightward position of the gate 56 relative to its horizontal pivot point 58.

Figure 4:
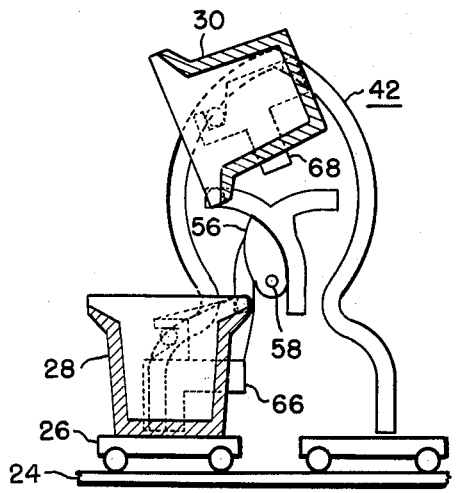

In Figure 4 the pouring ladle 30 and the gate 56 are shown in the complete emptying position of the ladle 30 into the ladle 28 corresponding to step 5 foregoing. The fact that the pouring ladle 30 has just made its movement upwardly and to the left in this figure is evidenced by the leftward position of the gate 56 relative to its pivot point 58.

Figure 5:
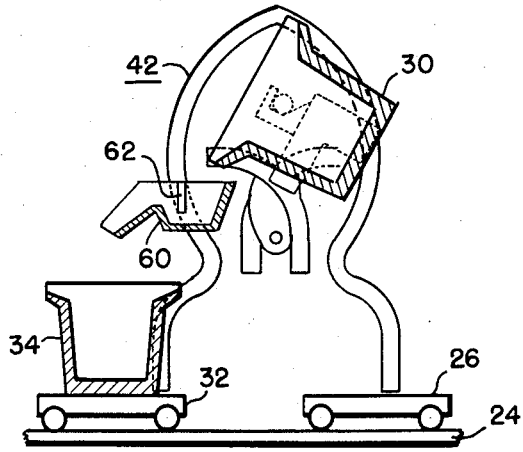
Figure 5 is similar to Figure 4 but shows a ladle in a partial emptying position and having an intermediate trapping ladle immediately therebelow.

In Figure 5 the pouring ladle 30 is shown in the partially emptying position corresponding to step 9 foregoing. In this step the waste ladle 34 is receiving the stream of exhausted ore being discharged from a trapping ladle 60 which is interposed in the path of the stream. The trapping ladle 60 is the one through which the lighter exhausted ore is poured from off the top of the heavier metal bath in the ladle 30 and the trapping ladle has a cross wall 62 leaving a passage between it and the floor of the ladle. The trapping ladle 60 therefore holds back any heavier particles of ferro-nickel from the bath which had been possibly dragged along with the exhausted ore at the time of the pouring. The ladle 60 freely passes along the lighter exhausted ore. The trapping ladle 60 similarly cooperates with the pouring ladle 28 during the next cycle of pourings at the proper point when the exhausted ore is to be poured off the top of the heavier metal bath in ladle 28.

In Figure 6 the ladle 28 of metal is shown in its complete emptying position corresponding to step 12 in which an interposed catch ladle 64 receives and collects a quantity of the metal bath and by-passes the remainder into the receiving ladle 30 holding the molten ore. The volume of this catch ladle 64 is at least equal to the volume of ferro-nickel to be eliminated. At the time of the emptying, for instance of the ladle 28 into the ladle 30 through the catch ladle 64, there is left in this ladle 64 the volume of ferro-nickel corresponding to the volume of the ladle up to its pouring spout. It is possible to very easily adjust the volume thus taken out by tilting the catch ladle to the proper degree making its useful volume vary. The constituents of the ferro-nickel bath to be poured into the ore are preferably limited to the range of about 25% to 60% nickel by weight and the balance iron. In the stated range of not exceeding a maximum of about 60% nickel, the bath never becomes too nickel-rich to longer be an effective reducing agent for substantially completely de-nickelizing molten low-grade oxidic nickel ores.

In Figures 7 and 8 a pair of ladle-elevating carriers 66 and 68 for the respective ladles 28 and 30 are shown in their operative relationship with respect to the roller tracks 42. The ladle carrier 66 is representative of both carriers and the ladle 28 is likewise representative of both pouring ladles and in the interests of brevity only these two elements will be particularly described in connection with Figures 7 and 8. The ladle 28 has a lifting flange 69 about the girth thereof and in the vicinity of the lifting flange this ladle 28 has a pair of laterally directed trunnions 70 with their axes disposed in a common vertical reference plane 72 containing the center line of the ladle. The mouth of the ladle 28 is upright as the ladle is viewed in Figure 7 and includes a pouring spout 74 extending forwardly with reference to the vertical reference plane 72. The carrier 66 is open at the left side as viewed in Figure 7 so as to receive the ladle 28. The carrier 66 is also open at the bottom and it has a pair of spaced supporting shoulders 76 immediately below and defining a slight clearance space with lifting flange 69 on the ladle as the ladle 28 rests upon the self-propelled truck 26. The carrier 66 has an oppositely directed pair of spaced stub axles which carry a set of front roller wheels 78 rotatable thereupon and transversely aligned with the pouring spout 74 of the ladle 28. These aligned roller wheels 78 are slightly offset frontwardly of the main body of the ladle, however, and are received within the inner tracks 50 of the roller track system 42 which employs rails of channel-shaped cross section as guideways for the roller wheels. At a point adjacent the bottom of the ladle 28 and rearwardly of the vertical reference plane 72, the carrier 66 has another pair of oppositely directed stub axles carrying a set of rear roller wheels 80 received in one of the outer pair of channel section tracks 44 which guide the same. Guided movement of the roller wheels 80 in their track 44 upwardly and outwardly relative to the roller wheels 78 as a center causes the carrier 66 to rotate clockwise and tilt the carrier 66 and the ladle 28 therewith. Accordingly, the carrier 66 is provided with a relieved crotch portion 82 at each side having a retaining lug 83 at the upper end and being open at the rear side below the end of the lug 83. Therefore, as the carrier 66 tilts clockwise about the roller wheels 78 as a center, the ladle trunnions 70 settle and fit snugly into the relieved crotch portions 82 of the carrier.

The interconnection and overall operation of the two ladle-elevating carriers 66 and 68 is best understood from Figure 8. At two laterally spaced points between, but adjacent the respective rear roller wheels of each carrier 66 and 68, these carriers are mutually interconnected by means of the respective end lengths 84, 85 of a pair of spaced parallel chains which are passed across and around an overhead power driven winch 86 which is midway between the carriers. When for example, the end length portions 85 of the two chains are simultaneously foreshortened under tension owing to counter-clockwise rotation of the winch 86 in Figure 8, the carrier 68 rides upwardly with its roller wheels 80 and 78 both moving in companion arcuate portions of the respective outer and inner tracks 44 and 50. The front roller wheels 78 strike the switching device formed by the gate 56 so as to pivot it about the axis 58 to a point where the force of gravity will thereafter hold it in a position blocking the intersecting inner track 50. At the point at which the rollers 80 had passed the midportion 46 of the outer track 44, the front rollers 78 occupy the extension portions 54 of one of the inner tracks and are capable of only limited further movement. Continued shortening of the two chain length portions 85 causes the carrier 68 to pivot about the front roller wheels 78 as a center and describe an arc at the rear in which the rear roller wheels 80 follow the locus of the upper curved end of the outer track 44. Reversal of direction of the winch 86 enables the carrier to reverse its rotation about the wheels 78 as a center and eventually to withdraw these wheels 78 along the gate 56 and the inner track 54—50 to their starting position. Shortening of either set of length portions 84 or 85 of the chains by tension from the winch results in slack occurring in the other length portions so as to insure at all times that one carrier will be in its lowest position before the other begins rising with a ladle.

The ladle trunnions 70 occupy the common reference plane 72 transverse to the ladle and define a trunnion pivot axis therefor which in customary fashion intersects the longitudinal central axis of the ladle at a fixed point which is always between the ladle mouth and its center of gravity no matter where that center of gravity shifts within the limited latitude afforded it depending on whether the ladle is empty or completely or partially full of a dense, light or intermediate composition contained therein. At the same time, that fixed point of intersection between the two named axes is always between the mouth of the ladle and the plane of the interface of contact that the carrier shoulders make with the girth flange 69 on the ladle. Because the center of gravity and the lifting flange are on the same side of the trunnions 70 so as to be lower than the trunnions and farther away from the ladle mouth, it follows that when the carrier tips the ladle to a full horizontal position and beyond by clockwise rotation about the wheels 78 as a center, the flange 69 engages the carrier shoulders 76 to prevent the ladle from reverse pivoting in a counter-clockwise sense about the trunnion axis as a center and in fact the center of gravity of the ladle is so located to give continual opposition to the ladle from tilting beyond the emptying position represented in Figures 2 to 6. Simultaneously, the trunnions 70 seat firmly in the relieved crotch portion 82 in the carrier and the retaining lug 83 effectively retains the ladle in the carrier as it passes beyond the full horizontal position.

By the present improved carrier means, the pouring ladles are not arranged to pivot about the customary center axis of the trunnions, but about an axis external to the body of the ladle, namely, the common axis of the carrier front axles and wheels 78 which passes through the pouring spout 74. Therefore, the point at which the stream itself originates during pouring tends to remain stationary without appreciable shift and the stream can thus be uniformly and accurately directed.

Variations within the spirit and scope of the invention described are equally comprehended by the foregoing description.

I claim:

1. In a mixing apparatus, ladle elevating carriers having guided portions, means engaged thereby presenting fixed inner and outer pairs of guideways to guide the carriers, at least one pair of which intersect at a common point between their ends, and a swingably mounted gate at said common intersection which when deflected due to engagement with a carrier moving in one guideway path pivots into a position obstructing another guideway path to prevent diversion thereinto by that carrier.

2. In a track and roller type apparatus for handling ladles having trunnions thereon, an improved ladle elevating carrier which is open at the rear and bottom ends, said carrier having track connected rollers at the front, a ladle supporting shoulder on the carrier below said front rollers presenting a transverse surface for engagement with a lifting flange on the ladle as it settles in the carrier for being elevated thereby, said carrier further having track-connected rollers at the rear thereof, and relieved portions formed on the carrier between the front and rear rollers and defining spaced crotch means arranged in transverse alignment straddling the longitudinal center line of the ladle and facing laterally for engaging the oncoming ladle trunnions.

3. Mixing apparatus comprising ladle carriers having guided end portions, means engaged thereby presenting fixed inner and outer pairs of intersecting guideways for the carriers, at least one pair of said intersecting guideways having a short extension portion beyond the intersection, lift means comprising a common overhead winch and actuatable to move each carrier substantially equal distances of travel along companion portions of the inner way of one pair and the outer way of another pair whereby the guided end portions of the carrier move substantially parallel to one another as it rises to a predetermined initially moved position, said lift means further comprising chain means with the midportion trained across said winch means so as to present end portions hanging at opposite sides thereof for attachment to different ones of said carriers, thereby constituting an operating member common thereto and constituting the sole means of carrier support, said short extension portion of said one pair intersecting guideways receiving one guided end portion of the carrier in its predetermined initial position aforesaid, and a curved formation in the other guideway engaged by the carrier whereby further actuation of said lift means causes the carrier to pivot about said one portion thereof as a center as the other guided end portion travels along said curved formation to bodily tilt the carrier for side pouring.

4. Mixing apparatus comprising ladle carriers having guided end portions, means engaged thereby presenting fixed inner and outer pairs of intersecting guideways for the carriers, at least one pair of said intersecting guideways having a short extension portion beyond the intersection, lift means actuatable to move each carrier substantially equal distances of travel along companion portions of the inner way of one pair and the outer way of another pair whereby the guided end portions of the carrier move substantially parallel to one another as it rises to a predetermined initially moved position, said short extension portion of said one pair of intersecting guideways receiving one guided end portion of the carrier in its predetermined initial position aforesaid, a curved formation in the other guideway engaged by the carrier whereby further actuation of said lift means causes the carrier to pivot about said one portion thereof as a center as the other guided end portion travels along said curved formation, and a gate device at the intersection of said one pair of guideways which is deflected by that carrier moving in the ways of said one pair to block the other way thereof against entry by the carrier.

5. In a handling system for a ladle provided at the girth with a lifting flange and with trunnion means, the combination therewith of a ladle carriage supporting the same and mounted for movement in a horizontal path, a frame disposed at each side of said path and presenting a fixed roller track at that side, a carrier riding said roller tracks between upper and lower positions therein and being open at one side and the bottom to receive the ladle from the carriage when the carrier occupies the named low position, said carrier having complementary supporting shoulders providing a clearance space slightly below the lifting flange on the ladle occupying said carriage, said carrier further having an elevated crotch portion open at one side for facing laterally to receive and engage the trunnion means on said ladle, and means to raise the carrier in said roller track to take up the clearance with the ladle such that it settles on the carrier shoulders to transfer the weight of the ladle directly from the carriage to the carrier.

6. In a handling system for a ladle provided at the girth with a lifting flange and with outwardly extending trunnion members, the combination therewith of a ladle carrier framework presenting fixed roller tracks, and a ladle carrier having first and second connections to said tracks for effective translatory and rotative movement of the carrier in said ladle carrier framework, said carrier having complementary supporting shoulders providing a clearance space slightly below the lifting flange on the ladle, said carrier further having an elevated crotch portion disposed between its points of first and second connections aforesaid and open at one side for facing laterally to receive and engage the trunnion members on said ladle, said points of first connection between the carrier and the tracks being transversely aligned with a point adjacent the mouth of said ladle but outwardly offset from the body of the ladle, and the locus of travel of the carrier due to its points of second connection with the tracks being arcuate along at least a portion thereof to provide for the aforesaid rotative movement of the carrier and the ladle about said offset point beyond the body of the ladle as a center.

7. The combination with a ladle provided with a lifting flange and with trunnions at the side of the ladle disposed in a vertical reference plane containing its center line, there being a pouring spout at the upper end of the ladle disposed in frontwardly offset relationship from said reference plane, of a ladle carrier open at the rear end thereof to receive the ladle and having supporting shoulders engaged with and supporting the lifting flange on the ladle, said ladle carrier further having a trunnion receiving portion relieved at the rear side so as to facilitate being directly engaged by said trunnions to support the same, a first pair of fixed confronting tracks engaged with means on the carrier which are transversely aligned along a horizontal axis at least proximately intersecting said pouring spout at the front side of the reference plane and providing for rotative and for longitudinal movement of the carrier in said tracks, and a second pair of confronting tracks engaged with means on the carrier transversely aligned with the bottom end of the ladle at a point rearwardly offset from said vertical reference plane whereby continued rising movement of the carrier so as to primarily undergo said rotative movement relative to the first tracks causes the ladle to pivot about said horizontal axis adjacent the pouring spout as a center.

8. Apparatus for mixing material between containers on opposed ladle elevating carriers, said apparatus comprising, in combination, a pair of side frame means arranged at the sides of each carrier with each pair symmetrical to the other with respect to a transverse vertical midplane therebetween and presenting a plurality of convergently inclining carrier tracks which mutually cross one another in at least one point adjacent the midplane common thereto as aforesaid, for introducing a partially inverted tilting action on each carrier in the progress of being elevated a common overhead winch, and interposed lifting chain means trained at its midportion across said common winch, said overhead midportion of said chain means constituting an operating member having connections at the opposite end length portions thereof for attachment to different ones of said carriers so as to constitute the sole support therefor whereby shortening of the length at one end by tension on the common winch manifests itself in slack occurring in an opposite length to insure at all times that one carrier will occupy its lowermost position at least substantially by the time at which the other begins rising for tilting the container carried thereby.

9. Apparatus for mixing material between containers on opposed ladle elevating carriers, said apparatus comprising a pair of side frame means arranged at the sides of each carrier with each pair symmetrical to the other with respect to a transverse vertical midplane therebetween and presenting carrier tracks which mutually cross one another at spaced elevated points in the midplane common thereto as aforesaid, a reversible winch common thereto, interposed lifting chain means trained across said common winch, said chain means having connections at the opposite end length portions thereof for attachment to different ones of said carriers whereby shortening of the length at one end by tension on said common winch manifests itself in slack occurring in an opposite length to insure at all times that one carrier will occupy its lowermost position at least substantially by the time at which the other begins rising with a container, and a gate device disposed at one of said mutual crossings and operative to keep a carrier which is on one track as it enters said crossing, in an uninterrupted path across the intersecting track without permanently transferring into the latter.

10. Apparatus for mixing material between containers on opposed ladle elevating carriers, said apparatus comprising a pair of side frame means arranged at the sides of each carrier with each pair symmetrical to the other with respect to a transverse vertical midplane therebetween and presenting carrier tracks which mutually cross one another at at least one elevated point in the midplane common thereto as aforesaid, interposed lifting chain means having connections at the opposite end length portions thereof for attachment to different ones of said carriers whereby shortening of the length at one end by tension thereon manifests itself in slack occurring in an opposite length to insure at all times that one carrier will occupy its lowermost position at least substantially by the time at which the other begins rising with a container, and a gate device pivoted at the lower end adjacent said elevated point to protrude upwardly into the track crossing in a gravity retained position keeping a carrier which is on one track entering the crossing, in a path across the intersecting track at said crossing without permanently transferring into the latter.

11. In apparatus of the class described, separate, fixed roller tracks with upper portions, and further including generally vertically extending portions at the lower end, and midportions defining crossed paths which form a four-way intersection at a common point between their ends, devices mounted for reciprocation from a lower position of rest in said apparatus and carrying rollers permanently arranged to roll on different ones of the roller tracks, and a track gate having a pivoted position crosswise to and directly engaged by each roller to deflect into the direction of motion thereof as it reciprocates from the rest position, said track gate being operatively located at the convergency of said paths adjacent the aforesaid point of crossing and adapted alternately at either track as soon as each roller withdraws through its path of reciprocation to be engaged and deflected by the next roller approaching on the other track.

12. Mixing-ladle apparatus for use in conjunction with ladle carrying, rail trucks at a point along a trackway, comprising the combination of a plurality of ladle carriers for receiving and lifting ladles and for supporting the ladles for movement both ways and for returning same to an individual receiving truck, a framework which is provided with side guides and in which the carriers are symmetrically disposed for rolling movement in different ones of the guides into tilted positions with the ladles alternately overhanging one another, overhead power delivery means consisting of winch means thereabove common to said carriers at a point for applying power to cause them to rise into tilted position for a side pouring operation and to return to their receiving truck, and interconnecting chain means connected at the ends to both carriers and connected to and trained at its midportion about the winch means for cooperation with said guides so as to direct each downwardly moving ladle at a prior time to a point on, and thereafter gather slack in cooperation with, its receiving truck so as to stay precisely aligned with the core of the incipient side poured stream from the other ladle.

13. High temperature mixing apparatus to handle ladles of materials to be mixed and being adapted for use with ladle carrying, rail trucks at a point along a trackway, at least one of the materials to be handled being in the molten state, said apparatus comprising the combination of a plurality of ladle carriers for receiving and lifting the ladles and for supporting the ladles for movement both ways and for returning same to an individual receiving truck, a framework which is provided with side guides and in which the carriers are symmetrically disposed for rolling movement in different ones of the guides into tilted positions with the ladles alternately overhanging one another, overhead power delivery means consisting of winch means thereabove common to said carriers at a point for applying power to cause them to rise into tilted positions for a side pouring operation and to be returned empty in a downward direction, said carriers being open sided and confined to a path at all times above the level of the path of the rail trucks to facilitate free entry and free removal of a truck therebeneath for free access of the ladle with respect to the carrier, and interconnecting chain means connected at the ends to both carriers and connected to and trained at its midportion about the winch means for cooperation with said guides so as to direct each downwardly moving ladle at a prior time to a point on, and thereafter gather slack in cooperation with, its receiving truck so as to stay precisely aligned with the core of the incipient side poured stream from the other ladle.

References Cited in the file of this patent

UNITED STATES PATENTS

| | | |
|---|---|---|
| 310,393 | Downing | Jan. 6, 1885 |
| 894,749 | Von Siller | July 28, 1908 |
| 1,783,128 | Morgan | Nov. 25, 1930 |
| 1,879,409 | Morris | Sept. 27, 1932 |
| 1,917,837 | Haddlesay | July 11, 1933 |
| 2,067,883 | Allen | Jan. 19, 1937 |
| 2,100,265 | Perrin | Nov. 23, 1937 |

FOREIGN PATENTS

| | | |
|---|---|---|
| 888,677 | Germany | Sept. 3, 1953 |
| 8456/93 | Great Britain | Mar. 10, 1894 |
| 23,342 | Great Britain | Aug. 30, 1906 |